United States Patent [19]
Goff

[11] 3,756,134
[45] Sept. 4, 1973

[54] FILM MOVEMENT PREVENTING MEANS FOR STILL CAMERAS
[75] Inventor: Milton R. Goff, Rochester, N.Y.
[73] Assignee: Eastman Kodak Company, Rochester, N.Y.
[22] Filed: Aug. 21, 1972
[21] Appl. No.: 282,630

[52] U.S. Cl. .......................... 95/31 FM, 95/31 FL
[51] Int. Cl. ........................................ G03b 19/04
[58] Field of Search ..................... 95/31 FM, 31 FL, 95/31 R; 242/71.4

[56] References Cited
UNITED STATES PATENTS
3,603,236  9/1971  Engelsmann.................... 95/31 FM
3,682,066  8/1972  Simon.............................. 95/31 FM
3,628,432  12/1971 Ettischer......................... 95/31 FM
3,148,605  9/1964  Peterson et al................ 242/71.4 X Primary Examiner—Richard L. Moses
Attorney—W. H. J. Kline et al.

[57] ABSTRACT

A camera for perforated roll film includes a transport mechanism for advancing film along an exposure plane and a metering mechanism for selectively disabling the transport mechanism. A flim sensing pawl is movable by advancing film from an extended position traversing the film through a film perforation to a metering position spaced from the extended position in the direction of film advancement for disabling the transport means when the sensing pawl reaches its metering position. A spring force on the control member urges the sensing pawl from its metering position toward its extended position. Means are provided for moving the sensing pawl away from the trailing edge of a perforation during operation of the camera's exposure mechanism so that the spring force is not transmitted through the sensing pawl to the film.

4 Claims, 3 Drawing Figures

PATENTED SEP 4 1973   3,756,134

3,756,134

FILM MOVEMENT PREVENTING MEANS FOR STILL CAMERAS

CROSS-REFERENCE TO RELATED APPLICATION

Reference is made to commonly assigned, copending U.S. Pat. application Ser. No. 203,524, entitled FILM METERING MECHANISM FOR CAMERAS, filed Dec. 1, 1971 in the name of David E. Beach.

BACKGROUND OF THE INVENTION

1. Field of the Invention

The present invention relates to cameras having means for detecting the presence of a film perforation to selectively lock and release the film transport mechanism, and more particularly to such cameras having means for minimizing any surge of force from the detecting means onto the film during an exposure interval.

2. Description of the Prior Art

The present invention is an improvement over cameras of the type disclosed in copending, coassigned U.S. Pat. application Ser. No. 203,524, entitled "Film Metering Mechansim for Cameras" filed Dec. 1, 1961 in the name of David E. Beach. In the camera therein disclosed, a metering lever is movable between an active position disabling the camera's film transport mechanism and an inactive position. A film sensing pawl is mounted for movement from a retracted position engaging the film surface, through an extended position transversing the film when intercepting one of the film perforations, to a metering position spaced from the extended position in the direction of film advancement by the trailing edge of the perforation as the film is advanced. The film sensing pawl and the metering lever are associated such that the metering lever is moved to its active position upon movement of the sensing pawl to its metering position. A spring urges the sensing pawl from its metering position toward its extended position and, since the metering pawl remains in the film perforation during exposure, the spring force is applied also to the trailing edge of the film perforation. This force on the film is opposed by frictional forces between camera elements and between the film and camera and/or cartridge surfaces. When the shutter is tripped, minor vibrations travel through the camera. These vibrations may relieve static friction wherever it occurs within the camera. Loss of frictional forces restraining the film can cause the spring force on the film from the pawl to move the film during exposure.

SUMMARY OF THE INVENTION

It is an object of the present invention to reduce or eliminate the possibility of film movement during the exposure period by eliminating the force of the film sensing pawl on the trailing edge of the film perforation during a picture-taking operation when the camera vibrations can suddenly relieve frictional restraints.

In a preferred emobdiment of the invention, this object has been accomplished by physically removing the sensing pawl from contact with the film upon actuation of the camera's shutter release lever.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
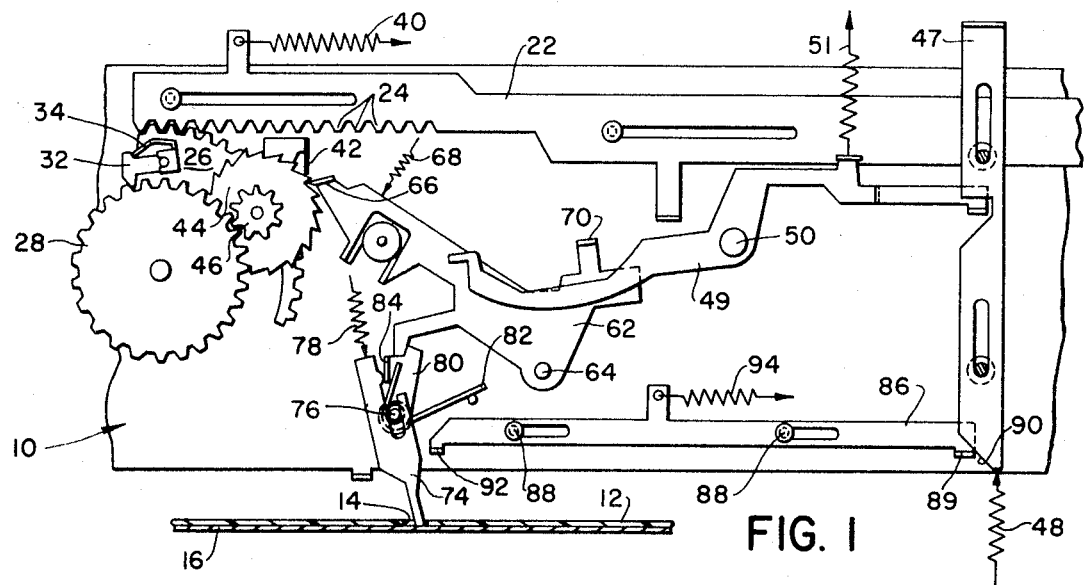
FIG. 1 is a view of a portion of a camera in accordance with the present invention and showing the camera elements in their positions ready to make an exposure.

Referring to FIG. 1, the camera illustrated includes a housing 10 into which a strip 12 of film perforated at predetermined metering intervals, such as at 14, and a strip of opaque backing paper 16 has been loaded. The film may be contained in a cartridge of the type shown in coassigned U.S. Pat. No. 3,138,081 which issued on June 23, 1964 to Hubert Nerwin.

A slide member 22 is reciprocally mounted on housing 10 by a pin-in-slot arrangement. The slide member has a rack with a plurality of teeth 24 in meshing engagement with the teeth of a gear sector 26 coaxially rotatable with a gear 28. Rotation of gear 28 in the direction of arrow 38 in FIG. 3 winds film in the direction of arrow 30. Gear 28 has teeth in meshing engagement with a ratchet pawl 32 rotatably mounted on gear sector 26 and biased by a spring 34 into engagement with the teeth of gear 28 so that, upon movement of slide member 22 in the direction of arrow 36 in FIG. 3, the rotary movement of gear sector 26 is transmitted to rotate gear 28 in the direction of arrow 38, thereby advancing film along the camera's exposure plane in the direction of arrow 30. As slide member 22 is returned to the right by a spring 40, gear 28 is prevented from rotating in a counterclockwise direction by a leaf spring 42 which cooperates with the teeth on a ratchet wheel 44 on a gear 46 in meshing engagement with gear 28.

A shutter release lever 47 is slidably mounted on the camera housing for downward movement against the force of a spring 48 to rotate a firing lever 49 in a clockwise direction about a pivot 50 against the force of a spring 51. Rotation of firing lever 48 releases a high energy lever, not shown, to effect an exposure as described in the abovementioned copending application.

A metering lever 62 is rotatably carried on housing 10 by a stud 64 and carries a metering pawl 66 urged toward an active position in engagement with the teeth of ratchet 44 by a spring 68 to prevent rotation of gear 28. A tab 70 on metering lever 62 is in alignment with the high energy lever to cause clockwise rotation of metering lever 62 when the high energy lever is released.

A film sensing pawl 74 is mounted for rotational and longitudinal movement on a stud 76 and is urged by a spring 78 toward film 12. A control member 80 is also rotatably carried by stud 76 and is urged in a counterclockwise direction by a spring 82 so that a tab 84 on the control member engages sensing pawl 74 to rotate the sensing pawl in a counterclockwise direction. A lever element 86 is sidably carried on a pair of pins 88 and has a first tab 89 in alignment with a cam surface 90 on shutter release lever 47 and a second tab 92 in alignment with sensing pawl 74. A spring 94 urges lever element 86 to the right as viewed in FIG. 1.

OPERATION

FIG. 1 shows the elements of a camera in their respective positions after the film has been advanced and when the camera is ready to be operated to take a picture. Metering pawl 66 of lever 62 is in its active position in engagement with ratchet 44 so that slide member 22 cannot be moved to the left to transport more film. Film sensing pawl 74 is extended through perforation 14 and has been rotated in a clockwise direction by the advancing film to a metering position.

Figure 2:
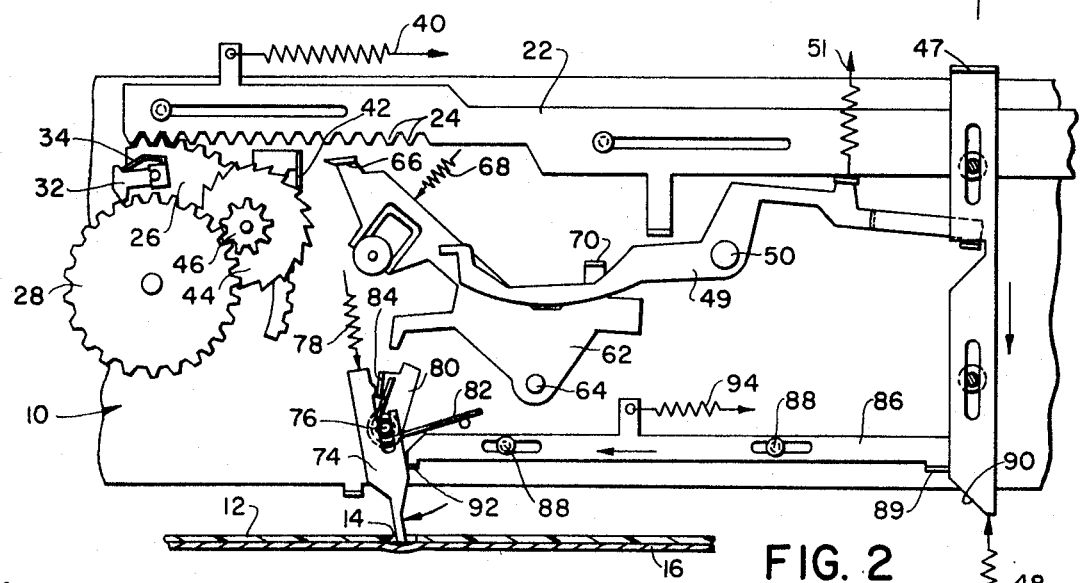
FIG. 2 is a view similar to FIG. 1 showing the camera elements in their positions immediately following an exposure.

To effect an exposure, the operator manually depresses shutter release lever 47 which, as shown in FIG. 2, rotates firing lever 49 to release the camera's high energy lever. The high energy lever trips a shutter mechanism, not shown, and contacts tab 70 to raise metering pawl 66 from ratchet 44.

During movement of shutter release lever 47, cam surface 90 abuts tab 89 to slide lever element 86 to the left until tab 92 thereon engages sensing pawl 74 to move the pawl against the force of spring 82 away from the trailing edge of perforation 14. Thereupon, the force of spring 82 is removed from the film so that no side load is placed on film 12 from spring 82. Thus, when the shutter is tripped in a manner described in above-mentioned U.S. Pat. application 203,524 and camera vibrations are set up, there is no load on film sensing pawl 74 which might cause film movement to the right due to the loss of frictional resistance as mentioned hereinbefore.

Figure 3:
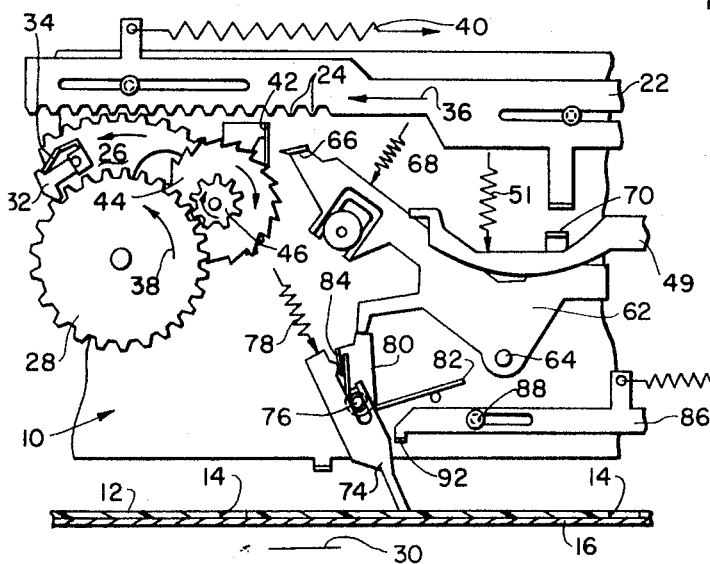
FIG. 3 is a view similar to FIG. 1 showing the camera elements in their positions as film is being advanced.

After an exposure has been made, slide 22 may be moved to the left to advance the next film exposure area into alignment with the camera's optical system. As shown in FIG. 3, movement of the slide member to the left rotates gear sector 26 in a counterclockwise direction. Sensing pawl 74 is cammed from the perforation in a manner described in application No. 203,524, and spring 82 is now free to rotate control member 80 in a counterclockwise direction causing, through tab 84, similar rotation of sensing pawl 74 to a position shown in FIG. 3 in which the sensing pawl rests on the film surface awaiting the arrival of the next suceeding film perforation. When the perforation reaches the sensing pawl, spring 78 causes the pawl to move to an extended position through the perforation so that continued movement of the film will pull the sensing pawl to its metered position shown in FIG. 1 to cause the camera's metering mechanism to disable the transport means as also explained in above-mentioned U.S. Pat. application 203,524.

The invention has been described in detail with particular reference to preferred embodiments, but it will be understood that variations and modifications can be effected within the spirit and scope of the invention.

I claim:

1. In a camera adapted to receive roll film perforated at predetermined metering intervals and having (1) transport means for advancing received film along the camera's exposure plane, (2) an exposure mechanism operable to effect exposure of the film at said exposure plane, (3) a film sensing member movable by the trailing edge of a film perforation in advancing film from a first position extending into such a film perforation advanced into alignment with said sensing member to a metering position spaced from said first position along said exposure plane in the direction of film advancement, (4) spring means associated with said sensing member to urge said sensing member toward its first position, the force of said spring means being transmitted to the film by said sensing member when said sensing member is in its metering position and (5) metering means associated with said transport means and said sensing member for disabling said transport means when said sensing member is moved to its metering position; the improvement comprising means associated with said exposure mechanism and said sensing member for relieving the force of said spring means on the film from said sensing member at least during operation of said exposure mechanism.

2. The improvement as defined in claim 1 wherein said spring force relieving means comprises means for moving said sensing member away from the trailing edge of the perforation in the direction away from said first position at least during operation of said exposure mechanism.

3. The improvement as defined in claim 1 wherein:
said exposure mechanism includes a shutter release lever movable in a predetermined direction to effect an exposure; and
said spring force relieving means includes means associated with said shutter release lever for relieving the force of said spring means on the film from said sensing member upon movement of said shutter release lever in said predetermined direction.

4. The improvement as defined in claim 3 wherein said means associated with said shutter release lever includes
an element movable in a predetermined direction to engage and move said sensing member away from the trailing edge of the perforation; and
means for moving said element in its predetermined direction upon movement of said shutter release lever in its predetermined direction.

* * * * *

UNITED STATES PATENT OFFICE
CERTIFICATE OF CORRECTION

Patent No. 3,756,134    Dated September 4, 1973

Inventor(s) Milton R. Goff

It is certified that error appears in the above-identified patent and that said Letters Patent are hereby corrected as shown below:

Column 1, line 23, change "1961" to --1971--;
         line 58, change "emobdiment" to --embodiment--.

Claim 1, column 4, line 26, after "means" insert --,operatively--;
         line 28, after "member" insert a comma --,--;
         line 29, after "member" insert --by moving said sensing pawl along said exposure plane to a position not in contact with the film--;
         line 29, after "during" insert --the period of--.

Signed and sealed this 25th day of December 1973.

(SEAL)
Attest:

EDWARD M. FLETCHER, JR.
Attesting Officer

RENE D. TEGTMEYER
Acting Commissioner of Patents